United States Patent Office

WILLIAM E. DUNN, OF DELAWARE, OHIO.

Letters Patent No. 64,411, dated May 7, 1867; antedated February 2, 1867.

---

IMPROVEMENT IN MANUFACTURE OF ARTIFICIAL TEETH.

---

The Schedule referred to in these Letters Patent and making part of the same.

---

TO ALL WHOM IT MAY CONCERN:

Be it known that I, WILLIAM E. DUNN, of Delaware, in the county of Delaware, and State of Ohio, have made new and useful Improvements in Artificial Teeth; and I do hereby declare the following to be a full, clear, and exact description of the invention, sufficient to enable one skilled in the art to which my invention is allied to use the same.

I take teeth moulded of porcelain material, either singly or in sections of two or more, and after a partial baking, which brings them to the "biscuit" condition, I insert them into the plastic porcelain material which is to form the "plate," and which is held in the matrix while the said insertion takes place. The associated plate and teeth forms a denture, and is removed from the matrix, biscuited, enamelled, and finished by subjecting to the last furnace heat.

The distinction between my invention and that of Loomis, as described in his Letters Patent of May 2, 1854, is this: I take biscuited teeth and insert them into the yet plastic plate in the matrix, the denture being then removed, biscuited, enamelled, and finished in the furnace. Loomis places in the matrix a sufficient amount of porcelain material to form a denture, and then, by hand, gives the required conformation to the teeth, all the material being yet in a workable condition, after which the denture is removed, biscuited, enamelled, and finished. We both use porcelain material alone, but I shape my teeth separately and insert them into the plastic plate, while Loomis carves his teeth out of the mass which forms the incipient denture.

When a tooth is first moulded it is plastic and fragile. By subjecting it to a heat of, say 1,500° Fahrenheit, it is hardened, and attains what is called a "biscuit" condition. Up to this point it is not materially shrunken by the heat. In this condition I take the teeth and embed them in the plastic material forming the artificial gum and plate. It is necessary that both the plate and the teeth should be in the condition described, the plate plastic and the teeth biscuited, for the following reasons: As to the plate, unless it is plastic or otherwise workable, the teeth cannot be readily set into their places; and as to the teeth, if they have not attained the biscuit condition, or thereabouts, they do not possess sufficient rigidity, and if they are much past that condition they have partially shrunk, and will injure the plate in which they are embedded when it comes to be subject to the heat of the fire. If a tooth partially or completely vitrified be embedded in the porcelain material in its unshrunken condition, the fire which contracts it will have more effect upon the plate than on the teeth, and the plate will be ruptured by the resistance offered by the comparatively unyielding teeth, or the latter will be crowded together by shrinkage of the plate deranging their position. If the teeth, after passing the enamelling stage, are placed in the unbaked plate, and the denture thus constructed exposed to the heat of the muffle, the effect will be to spoil the work. As is well known to dental experts, the operation of flowing the enamel is a very delicate one, and the appearance of the work is ruined by too prolonged exposure. Now, if the teeth alone had already been subjected to the heat, and the other portions had not been thus treated, the appearance of the teeth would be ruined before the other portions had attained the proper condition. The fact that the teeth have attained the biscuit condition before the plate does not impair the homogeneity of the denture, as no considerable contraction has yet taken place, and, the union being made of the teeth and plate, the denture is ready for the biscuiting, and the subsequent processes of enamelling and final furnace treatment in a muffle at a heat of say about 3,500° Fahrenheit.

I do not regard it as necessary to describe the mode of forming the matrix upon which to build the porcelain material destined to form the plate, as this is a question of detail familiar to mechanical dentists who make and use porcelain teeth and dentures, and no particular construction of the matrix is necessary to the use of my invention, while that described in the patent of Loomis, above referred to, will give such information as is necessary.

The operation of biscuiting the teeth preparatory to inserting them into the plastic plate is to give them a certain degree of solidity, so that they may be handled and fitted without defacement. They may be hardened by other means than biscuiting, as, for instance, causing them to absorb wax when in a heated and porous condition, which will, when cool, give them the required solidity, the wax being afterwards expelled when biscuiting the denture by the heat, which dissipates everything not possessed of a metallic base. I do not, therefore, confine myself to the use of biscuited teeth in the process, as teeth otherwise sufficiently hardened will be the substantial equivalent thereof.

Having described my invention, what I claim as new, and desire to secure by Letters Patent, is—

A denture constructed by the application of biscuited and unglazed teeth to the plastic body or base while in the mould, substantially as described.

WM. E. DUNN.

Witnesses:
    T. C. CONNOLLY
    L. F. WARD.